(12) United States Patent
Owen (10) Patent No.: US 6,488,117 B1
(45) Date of Patent: Dec. 3, 2002

(54) VERTICAL-FORCE VIBRATOR SEISMIC WAVE SOURCE

(76) Inventor: Thomas E. Owen, 10914 Bar X Trail, Helotes, TX (US) 78023-4043

( * ) Notice: Subject to any disclaimer, the term of this patent is extended or adjusted under 35 U.S.C. 154(b) by 0 days.

(21) Appl. No.: 09/938,976

(22) Filed: Aug. 24, 2001

(51) Int. Cl.[7] .............................................. G01V 13/04
(52) U.S. Cl. ...................... 181/121; 181/102; 181/112
(58) Field of Search ................................ 181/102, 112, 181/113, 114, 106, 121

(56) References Cited

U.S. PATENT DOCUMENTS

| | | | | |
|---|---|---|---|---|
| 4,147,228 A | * | 4/1979 | Bouyoucos | 181/114 |
| 5,031,719 A | * | 7/1991 | Baria et al. | 181/102 |
| 6,119,804 A | * | 9/2000 | Owen | 181/113 |
| 6,135,234 A | * | 10/2000 | Harris et al. | 181/106 |

* cited by examiner

*Primary Examiner*—Kim Lockett
(74) *Attorney, Agent, or Firm*—Jackson Walker L.L.P.

(57) ABSTRACT

A dynamic force transducer for generating vertically oriented compressional forces and motions at the surface of a solid medium. A frame is rigidly coupled in direct contact with the solid medium surface. At least one pair of identical driver units are mounted to the frame to impart vertically oriented forces to the medium. Compliant springs support the drivers and introduce mechanical resonances. The driver units are excited to produce the vertically oriented pushing and pulling forces along a common collinear vertical direction. The driver units also impart either continuous or pulsed oscillatory forces to produce prescribed seismic compressional waves in the medium.

25 Claims, 8 Drawing Sheets

VERTICAL-FORCE VIBRATOR SEISMIC WAVE SOURCE

BACKGROUND OF INVENTION

Seismic wave sources capable of generating controlled-waveform vibration signals in natural earth media and in engineered materials and geotechnical structures offer potential advantages over conventional sources such as explosive or weight-drop impulse sources. For example, when the radiated seismic waveform is accurately known as a result of controlled-waveform source excitation at one location on the ground, seismic waves detected at other locations can be processed to take advantage of their known coherence characteristics relative to the originating source signal. The desired signals can thereby be accurately and uniquely discriminated from non-coherent interfering noise to gain a useful enhancement in detected signal-to-noise ratio. Controlled-waveform operation of the source also allows the amplitude, time duration, and frequency spectrum to be adjusted to offset certain difficult or detrimental seismic wave propagation or reflection conditions that may occur in some field applications. As a first example, improved seismic resolution may be obtained in many applications by intentionally extending the frequency range and/or boosting the amplitude of the high-frequency spectral content of the source signal. In another example, repetitive source signal operation and detected signal waveform averaging can be employed with maximum success when the seismic source amplitude is adjusted to impart forces that are below the plastic deformation limit of the ground medium. Thus, through repetitive low-force operation, the effective controlled-source energy may be increased cumulatively in relation to the number of repeated source signal sequences which, when additively combined, will result in improved signal-to-noise ratio associated with weak target reflections such as those from small anomalies or low-contrast interfaces.

Conventional seismic sources, although dominated by impulsive techniques in practice, also include certain types of mechanical vibrator sources designed to generate frequency-variable sweep signals, typically in the frequency range of 5 Hz to 200 Hz. Vibrator sources of this type are designed and used for deep seismic probing applications in oil and gas exploration and, hence, are made large and powerful to generate the needed source energy. Large vibrator sources of this type employ hydraulic actuator techniques to generate vibrational forces typically in excess of 10,000 lbf which may be coupled to the ground either in vertical or horizontal orientations to generate seismic compressional waves or horizontally polarized shear waves. Such hydraulically actuated sources are dependent on fluid dynamic pressure and flow and, because of their high energy, require relatively large and massive ground-coupling base plates. For these reasons, present- day conventional controlled-waveform vibratory seismic sources have inherent limitations in generating controlled-waveform vibrations at frequencies above about 200 Hz. Sources of this type are also expensive and technically impractical for use in applications where small size is critical for access to the field survey site and/or where higher frequency operation is required for shallow-depth high-resolution seismic surveys.

Alternative force generating techniques for use as actuators in controlled-waveform seismic sources include electromechanical force transducers employing either piezoelectric or magnetostrictive force generation or electrodynamic force transducers utilizing a movable current-carrying coil in a magnetic field. These electrically powered transducer techniques are typically more compact than hydraulic methods and are potentially more accurately controllable in their operation as high-frequency seismic sources. Controlled-waveform seismic signals having high-frequency spectral content up to 1,600 Hz and higher are potentially obtainable using such alternative force generating techniques.

There is a growing need and an emerging commercial market for effective capabilities related to shallow high-resolution seismic surveys directed primarily toward shallow resource exploration, subsurface environmental surveys, and indirect sensing and detection of ground geotechnical conditions and anomalies. In comparison with existing technology, new seismic source techniques and systems appropriate for these shallow applications would preferably operate at relatively high frequencies (typically 200–1,600 Hz) in order to resolve relatively small target details and need only be capable of operating at relatively low dynamic forces (typically 100–1,000 lbf) to provide useful results at shallow depths and associated short propagation path lengths. Seismic vibrator sources having these operating characteristics may be deployed and operated to generate either vertically oriented or horizontally oriented forces on the ground surface.

When the vibrator is set up to generate predominantly vertical forces on the ground, the radiated seismic waves will consist of compressional (P) waves, vertically polarized shear (SV) waves, and a combination of these P and SV waves known as Rayleigh waves (surface waves). When the vibrator is set up to generate predominantly horizontal forces on the ground, the radiated seismic waves consist of horizontally polarized shear (SH) waves which radiate in the direction normal to the direction of the horizontal force and compressional waves and Rayleigh waves radiated in the direction parallel to the horizontal force. Vibrator sources of the type that generate horizontally oriented ground forces and radiate horizontally polarized shear waves have been discussed in detail in U.S. Pat. No. 6,119,804, which is incorporated herein for all purposes. Therefore, the object of this invention is to create a seismic vibrator source capable of generating vertically oriented forces in the ground to produce controlled seismic waveforms at frequencies typically up to 1,600 Hz and operating at moderate driving forces typically up to 1,000 lbf. This new seismic vibrator source is appropriately matched in size, cost, and mobility to applications in shallow geophysical and geotechnical field surveys.

BRIEF SUMMARY OF THE INVENTION

The controlled-waveform vibrator invention described herein consists of one, two, or more electromechanical force drivers operating either on the force generating principle employing piezoelectric or magnetostriction technology or the force generating principle employing electrodynamic force transducers acting on a frame comprised of a baseplate rigidly coupled to the ground medium and reacting against an inertial mass consisting of a compliantly supported part of the frame so as to impart vibratory dynamic forces to the baseplate and to the ground. In application, the baseplate is placed in firm contact with the ground surface such that the force generator is oriented in the vertical direction. The vertical force applied to the ground produces vertical particle motions in the ground medium and thereby generates seismic compressional waves (P waves) having particle motions normal to the plane of the baseplate which radiate into the body of the medium. Through inherent coupling between the vertical motions of the finite-size baseplate and the vertical shear forces produced at the edges of the plate, vertically oriented shear waves (SV waves) are also generated and radiated into the body of the medium simultaneously with the P waves. This source configuration, through its coherent generation of P waves and SV waves, also generates well-known Rayleigh waves (also referred to as 'surface waves') which are essentially confined to propagate only along the surface of the ground medium.

With the use of appropriate masses and compliant suspension springs in this composite vibration transducer assembly, the vibrator operating frequency range can be adjusted to have an upper limit of 1,600 Hz or higher. Further, by arranging the force driver units and reaction masses in an axisymmetrical alignment within a close-fitted frame and arranged with approximately uniform mass distribution within the frame, the tendency of the vibrator to produce nonuniform force distributions at the interface between the ground-coupling baseplate and the ground medium will be minimized. Thus, any undesirable components of dynamic force and motions, such as rocking or tilting, of the vibrator frame or baseplate which could cause horizontally polarized shear waves to be radiated in the medium will also be minimized.

The dynamic force driver unit or units are excited by one or more power amplifiers operating in the audio frequency range at a power level appropriate to drive the overall vibrator system to a total operating force of up to 1,000 lbf when coupled to a ground medium. Excitation signals applied to the vibrator driver may either be a swept-frequency sinusoidal time function having prescribed predetermined parameters of time-dependent frequency sweep, upper and lower frequency limits of sweep range, sweep time duration, and amplitude-time dependence, or alternatively a pulsed swept-frequency sinusoidal time function (commonly termed a 'chirp' signal) having predetermined amplitude, time, and frequency parameters, or alternatively a gated sinewave pulse having a predetermined frequency, pulse amplitude envelope, and repetition time period which may either be periodic or randomly timed, or alternatively a random noise function having predetermined statistical parameters. The predetermined parameters of these excitation signals govern the amplitude, frequency, and time characteristics of the radiated seismic waves.

The essential features of the seismic wave vibrator source disclosed herein are: (1) a baseplate and frame having a means for firmly and rigidly coupling the vibrator to the medium in which vertical dynamic forces produced by an integral electromechanical force driver generate seismic P waves in the ground; (2) a means by which one, two, or more dynamic force driver units are attached to the frame in a manner such that their forces are efficiently transmitted as purely vertical forces to the ground coupling interface via the baseplate; (3) one, two, or more dynamic force driver units, operating either on the piezoelectric or magnetostriction force generating principle or on the electrodynamic force generating principle, to mechanically excite directed forces on the baseplate in the desired seismic source vibrator frequency range; (4) one, two, or more inertial reaction masses suspended on the coupling frame by compliant springs and/or other isolation materials or components, these masses serving as inertial masses against which the force driver units react to apply dynamic forces to the frame and ground coupling baseplate; and (5) frame components constructed integrally with the baseplate to provide accurate and robust support of the reaction masses and compliant springs so as to avoid any tendencies for unwanted static deflections of the reaction masses or unwanted dynamic vibrations or tilting motions of the frame or baseplate during vibrational operation.

As a particular consequence of the finite physical size of the seismic wave vibrator described above, the essential components of the vibrator may be considered to be lumped-constant constant elements typically having the features of rigid mass, compliant spring, absorbent damper, and ideal force generation by electrical-to-mechanical transduction. To describe the energy absorbing characteristics of the earth or other medium to which the vibrator is coupled, this medium may also be represented as a network of effective lumped-constant masses, effective lumped-constant compliances, and effective lumped-constant absorptive dampers all of which interact to characterize the effective mechanical impedance of the medium including the storage and dissipation of vibrational energy in the medium and including the effects of energy lost from the vibrator system in the form of radiated seismic waves. These components comprise a multi-element network of mechanical spring-mass-damper elements which exhibits a mechanical transfer function by which the dynamic forces generated by the force driver units are converted to forces in the ground underlying the coupling baseplate and frame. The physical configuration and dynamic interactions of these components and the lumped-constant elements of the vibrator source govern the frequency response and transfer of mechanical power from the input force drivers to the radiation load in the ground medium.

BRIEF DESCRIPTION OF THE DRAWINGS

To aid in describing and understanding the essential features of the vertical-force seismic vibrator of this invention, several illustrative drawings, graphs, and parameter symbols are used. These illustrative figures and symbols are.

The following symbols are used in the illustrations:

$M_F$=mass of vibrator frame;
$M_g$=mass of ground medium;
$M_R$=mass of reaction mass;
$M_A$=mass of moving coil shaft;
$R_g$=damping in ground medium;
$R_R$=seismic radiation resistance;
$k_S$=stiffness of suspension spring;
$k_g$=stiffness of ground medium;
$k_L$=stiffness of variable suspension spring;
$k_A$=stiffness of moving coil shaft;
$k_x$=stiffness of piezoceramic stack;
$k_p$=stiffness of prestress bolt or rod;
$F_E$, $F_{E1}$, $F_{E2}$=electrodynamic driver force;
$F_X$, $F_{X1}$, $F_{X2}$=piezoelectric driver force;
P=static air pressure in pneumatic suspension;
F=static hold-down force on vibrator.

DETAILED DESCRIPTION OF THE PREFERRED EMBODIMENT

Figure 1A:
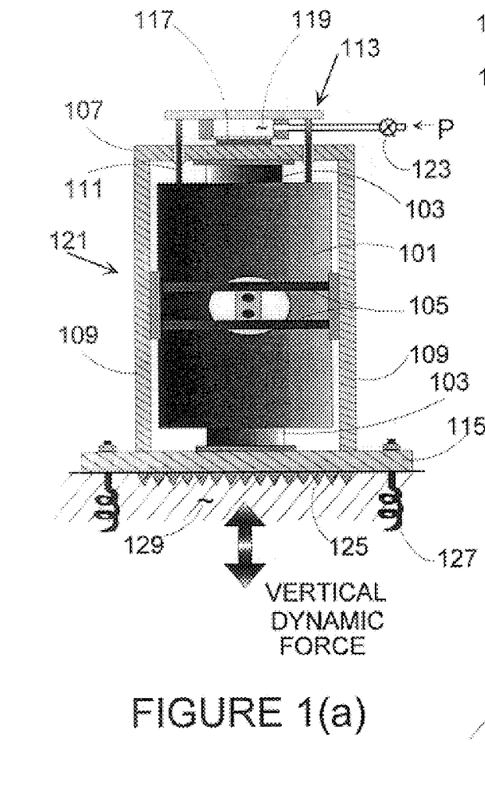
FIG. 1(a) shows a vertical-force vibrator employing a single electrodynamic force driver and illustrates a method of ground coupling employing ground anchor screws.
Figure 1B:
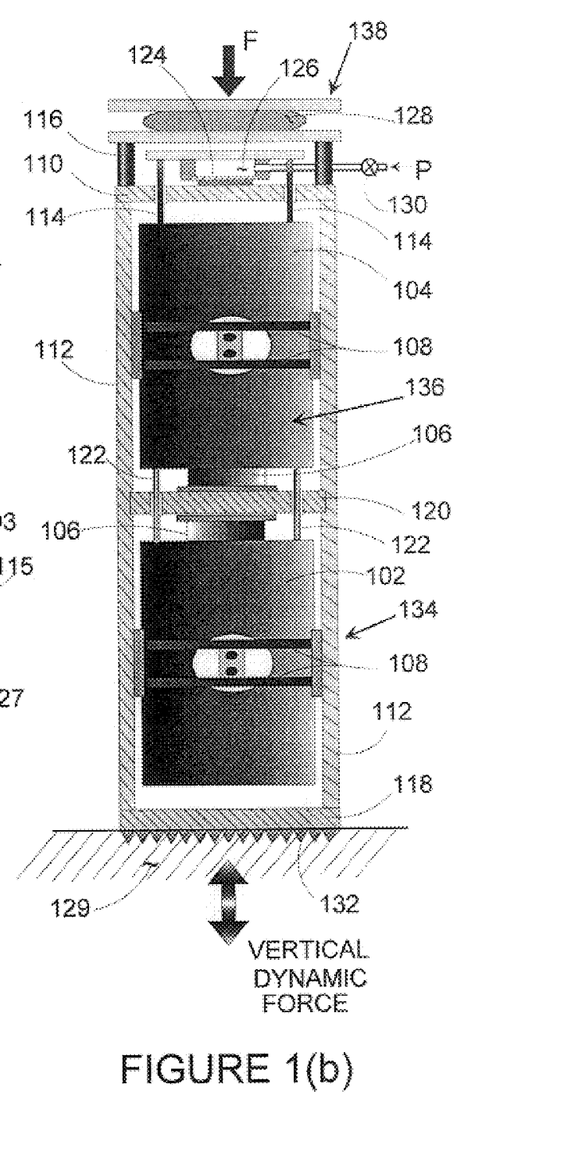
FIG. 1(b) shows a vertical-force vibrator employing two electrodynamic force drivers and illustrates a method of ground coupling employing an isolated supplemental hold-down force.

FIGS. 1(a) and 1(b) illustrate two physical embodiments of the seismic source vibrator invention which produce vertically oriented forces on the ground medium. The first embodiment, shown in FIG. 1(a), depicts a single-driver configuration by which the operating concepts described above are easily visualized and understood. The second embodiment, shown in FIG. 1(b), depicts a two-force-driver configuration whose design is capable of realizing the same operating concepts as described above. The physical components of these configurations are identified by numerical callouts in the illustrations and each configuration shows a different means by which the baseplate and coupling frame is firmly coupled to the ground medium for delivering uninterrupted dynamic force to the ground.

As shown in FIG. 1(a), a single electrodynamic force driver consisting of a magnet body and reaction mass 101 and a moving coil armature 103 is used to produce vertically oriented forces on the ground 129. In this configuration, the single magnet body and reaction mass 101 is mounted indirectly to the frame 121 via a pair of identical two-beam suspension springs 105 attached on diametrically opposite sides of magnet body 101 and the movable coil armature 103 passing axisymmetrically through the magnet body is attached to the top plate 107 and to the baseplate 115 of a unitized frame 121 having side plates 109 rigidly attached to the baseplate 115. The pair of two-beam springs 105 support and maintain the magnet body 101, which also serves as the force-driver reaction mass, in its centralized axial position during vibrational operation. The two-beam springs 105 as used in this application have the desirable property that their deflections at the center point of attachment to the reaction mass 101 are constrained to remain on the axis and on the line of action of the force developed by the electrodynamic driver, thereby minimizing any tendency for the reaction mass to tilt or undergo other non-axial motion as a result of dynamic vibrator operation. A supplemental compliant suspension system 113 is incorporated on the top of the vibrator unit to provide static support of the magnet-body reaction mass 101 to maintain it in proper alignment with the coil mounted on the coaxial moving-coil armature 103. A preferred form of the supplemental compliant support 113 is a pneumatic lifter consisting of a pressurized air chamber 119 having its rigid upper half attached to the reaction mass 101 by suspension rods 111 that pass through clearance holes in the top plate 107 and its lower half, consisting essentially of a flexible elastomer diaphragm 117, bearing upon the top plate 107 of the frame 121. By adjusting the air pressure P in the chamber 119, the lifting force and corresponding positioning of the reaction mass 101 can be changed to compensate for the downward gravitational deflection of the reaction mass 101 and two-beam spring 105 assembly. Other methods of supplemental suspension employing compliant elastomer pads or metallic coil springs or leaf springs having a means of mechanical position and deflection adjustment may be used in place of the pneumatic lifter suspension. By making the frame side plates 109, the top plate 107, and the baseplate 115 much stiffer than the compliant support springs 105, any undesirable compliance or flexural effects in these plates will be minimized and the lumped-constant spring-mass representation of the vibrator will be governed essentially by the effective compliance of the two-beam springs 105 and pneumatic suspension 113, the mass of the combined baseplate 115 and other parts of the frame 121, and the magnet body reaction mass 101 in conjunction with certain mass, compliance, frictional damping, and elastic wave radiation damping associated with the ground medium 129.

FIG. 1(b) shows a two-force-driver vibrator configuration in which the two electrodynamic driver units 102 and 104 are mounted on opposite sides of a transverse plate 120 located at the center of the vibrator frame 134 so that simultaneous pushing and pulling forces may be imparted by the two drivers, respectively, to move the unitized transverse plate 120, top plate 110, side plates 112, and ground coupling baseplate 118, all of which comprise the vibrator frame 134, in vertically oriented dynamic motions. The pushing and pulling forces created by this arrangement are achieved as a result of each force transducer mechanism acting appropriately against the center plate in reference to its associated inertial reaction mass assembly. To prevent any independent responses or unsynchronized motions between the two reaction masses 102 and 104, the two reaction masses 102 and 104 are rigidly linked together by stiff linkage rods 122 through clearance holes in the central plate 120 to form a single composite reaction mass assembly 136. Since the reaction masses 102 and 104 are relatively heavy, they must be supported in a way that allows the force transducer to operate properly and reliably. This support is provided by pairs of two-beam springs 108 attached at diametrically opposite positions on each side of the reaction masses 102 and 104 at their center of mass and the ends of the springs 108 are respectively attached to the side plates 112 which, in turn, are rigidly attached to the central transverse plate 120 and to the top plate 110 and baseplate 118 to form the unitized rigid vibrator frame 134. A second compliant suspension system 138 is incorporated on the top of the vibrator unit to provide static support of the reaction mass assembly 136 to maintain it in proper alignment with the coils mounted on the coaxial moving-coil armatures 106 of each force transducer unit. The preferred form of the supplemental suspension system 138 is a pneumatic lifter consisting of a pressurized air chamber 126 having its rigid upper half attached to the reaction mass assembly 136 by suspension rods 114 that pass through clearance holes in the top plate 110 and its lower half, consisting essentially of a flexible elastomer diaphragm 124, bearing upon the top plate 110 of the frame 134. By adjusting the air pressure P in the chamber 126, the applied lifting force and corresponding positioning of the reaction mass assembly 136 can be changed to compensate for downward gravitational deflection of the relatively heavy reaction mass assembly 136. By making the transverse plate 120, top plate 110, side plates 112, and the baseplate 118 much stiffer than the compliant support springs, any undesirable compliance or flexural vibration effects in these plates will be minimized and the lumped-constant spring-mass representation of the vibrator will be governed essentially by the effective compliance of the two-beam springs 108 and pneumatic suspension 138, the combined mass of the baseplate 118 and other parts of the frame 134, and the reaction masses 102 and 104.

Figures 1C, 1D:
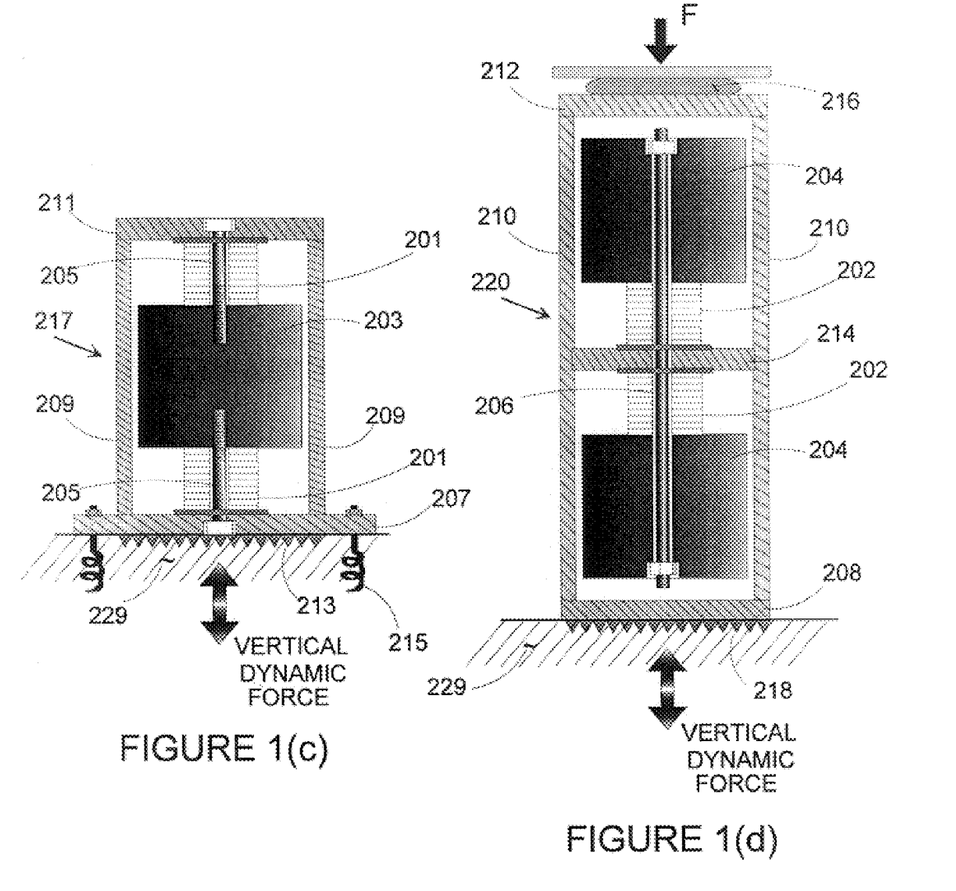
FIG. 1(c) shows a vertical-force vibrator employing a two-stack piezoelectric force driver arrangement acting on a single reaction mass and illustrates a method of ground coupling employing ground anchor screws.
FIG. 1(d) shows a vertical-force vibrator employing two piezoelectric stack drivers acting on two interconnected reaction masses and illustrates a method of ground coupling employing an isolated supplemental hold-down force.

FIGS. 1(c) and 1(d) illustrate single- and dual-force driver vibrator configurations employing piezoelectric transducer mechanisms for performing functions analogous to those of the electrodynamic drivers shown in FIGS. 1(a) and 1(b). In FIG. 1(c), two multi-element stacks of piezoceramic disks or plates 201 form electrically excited force drivers that operate between the vibrator frame 217, consisting of side plates 209, top plate 211, and baseplate 207, and a single reaction mass 203 to impart vibrational motions to the frame 217 and ground-coupled baseplate 207. The forces produced by the upper and lower piezoceramic stacks 201 are opposite in direction so that simultaneous pushing and pulling actions are applied to the frame 217 and baseplate 207. When the reaction mass 203 is sufficiently large, the motional displacements produced by the driver stacks 201 occur primarily at the frame 217 and, in particular, at the baseplate 207 and, hence, are also applied to the ground medium 229 by the baseplate 207. Strong axially oriented bolts 205 are used to compress the piezoceramic driver elements 201 together, resulting in a desirable prestress compression of the piezoceramic stack elements 201 so that they may intimately transmit their expanding and contracting driving forces efficiently to the frame 217, baseplate 207, and reaction mass 203. This method of rigidly assembling the piezoelectric driver eliminates the need for centralizing springs or other supplemental static suspension assembly for supporting the reaction mass 203 in its proper static position without any undesirable downward deflection effects caused by the earth's gravitational force acting on the reaction mass. FIG. 1(d) shows a two-force-driver configuration that employs two piezoceramic stack driver units 202 attached to a transverse central plate 214 which, in turn, is attached to the ground coupling baseplate 208 through rigid side plates 210, top plate 212, and baseplate 208 comprising the vibrator frame 220. The two piezoceramic drivers 202 are arranged to impart simultaneous pushing and pulling forces, respectively, on the central plate 214 so as to properly combine their axial driving forces delivered to the ground medium 229 via baseplate 208.

When oriented to produce vertical forces on the ground, the vibrator units shown in FIGS. 1(a) through 1(d) will generally require additional hold-down force applied to the top of the frame or otherwise be firmly attached to the ground medium. A practical means of applying additional hold-down force is illustrated in FIGS. 1(b) and 1(d) whereby an auxiliary weight or force F is applied to the top of the respective vibrator frames 134 and 220 through robust air- or oil-filled bladders 128 and 216, respectively, to press the vibrator frames 134 and 220 down against the ground. The bladder serves as a high compliance element to effectively isolate the auxiliary loading mechanism and the mass of its associated components required to produce the hold-down force from the dynamic mass of the vibrator frame assembly. With this arrangement, the auxiliary static hold-down force, F, can be made as large as necessary to achieve good ground coupling without the mass of the auxiliary loading system influencing the vibrational characteristics of the source system. FIGS. 1(a) and 1(c) show a means for physically attaching the respective baseplates 115 and 207 to the ground medium 129 by use of ground screws 127 and 215, respectively, in the form of steel 'cork-screw' anchors to which the baseplates 115 and 207 are attached by threaded fasteners. Other types of such anchors inserted into the ground medium may be used when necessary to attach the baseplate to a more rigid medium such as a concrete pavement slab or structure.

Figure 2A:
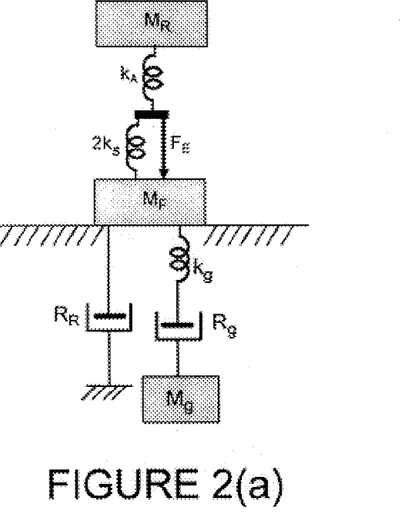
FIG. 2(a) illustrates a lumped-constant spring-mass-damper mechanical system representing the electrodynamic vibrator of FIG. 1(a).
Figure 2B:
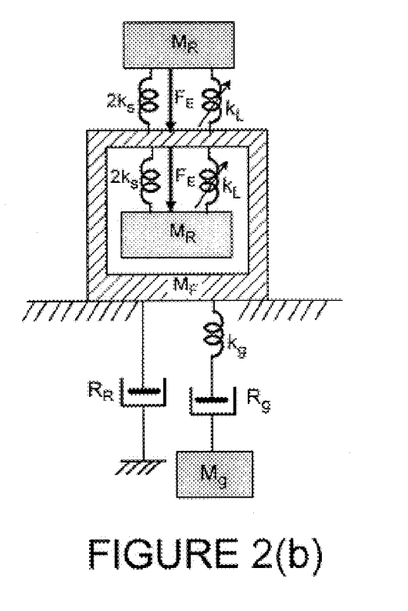
FIG. 2(b) illustrates a lumped-constant spring-mass-damper mechanical system representing the electrodynamic vibrator of FIG. 1(b) including adjustable-resonance compliance components.

FIGS. 2(a) through 2(d) show the lumped-constant spring-mass mechanical system models corresponding to the vertically oriented vibrator devices depicted in FIGS. 1(a) through 1(d), respectively. The springs and masses shown in these illustrations are associated with the physical components comprising the vibrator assemblies as identified by the symbol labels shown in each figure and defined earlier in the list of symbols. FIG. 2(a) represents the single electrodynamic driver vibrator of FIG. 1(a) in which the stiffness, $k_A$, of the moving coil armature is finite in value (not perfectly rigid). In many electrodynamic driver designs, however, the moving coil armature may be made sufficiently rigid that it can be omitted from the mechanical system model. This latter condition is shown in the mechanical system representation of the two-force-driver vibrator illustrated in FIG. 2(b). The spring-damper-mass combination, $k_g$, $R_g$, $M_g$, shown in FIGS. 2(a) through 2(d) represents the dynamic structure of the ground as a lumped-constant mechanical impedance consistent with vertical compressional force loading. The energy lost to compressional wave radiation in the ground is represented by a separate damper element, $R_R$, subject to the same vertical force and velocity as that of the baseplate. In all of the diagrams shown in FIGS. 2(a) through 2(d), the composite vibrator frames and baseplates, indicated by the symbol $M_F$, are assumed to be firmly coupled to the ground medium to permit direct vibrator interaction with the driving point mechanical impedance of the ground. FIG. 2(b) illustrates an adjustable stiffness suspension spring, $k_L$, in mechanical parallel with the pair of two-beam suspension springs, $2k_S$. This adjustable spring, $k_L$, discussed in detail later, provides a means for physically changing the mechanical resonance frequency of the vibrator. To achieve additive driving motions at the frame-to-ground interface, the two electrodynamic force transducers illustrated in FIG. 1(b) and modeled in FIG. 2(b), are driven with the same excitation waveform amplitude but with polarities of signal connection such that their pushing and pulling forces add constructively to produce an effective double-amplitude force on the vibrator frame.

Figure 2C:
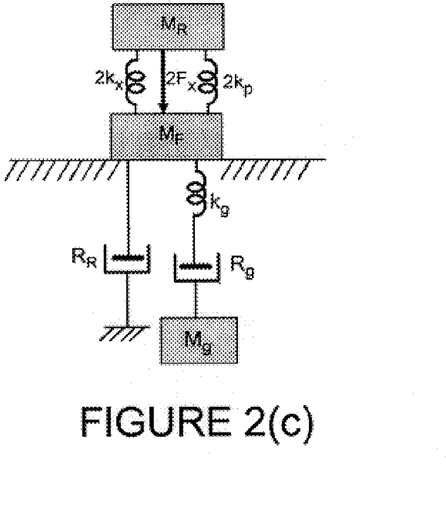
FIG. 2(c) illustrates a lumped-constant spring-mass-damper mechanical system representing the piezoelectric vibrator of FIG. 1(c).
Figure 2D:
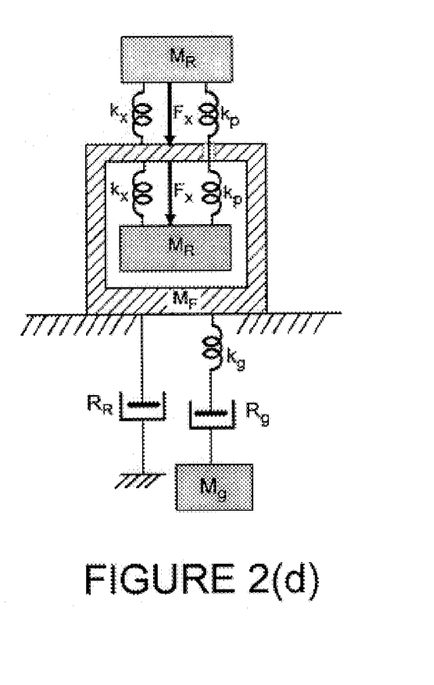
FIG. 2(d) illustrates a lumped-constant spring-mass-damper mechanical system representing the piezoelectric vibrator of FIG. 1(d).

FIG. 2(c) represents the piezoceramic-driver vibrator shown in FIG. 1(c) in which $k_X$ and $k_p$, respectively, represent the stiffnesses of the piezoceramic stack and the prestress bolt in each driver assembly and the force, $F_X$, corresponds to the force produced by each separate driver stack. The factors of two applied to these stiffnesses and to the force, $F_X$, shown in FIG. 2(c) arise from the fact that the vibrator frame is assumed to be ideally rigid so that both driver stacks, in effect, may be represented in mechanical parallel and the driving force doubled.

Figure 3A:
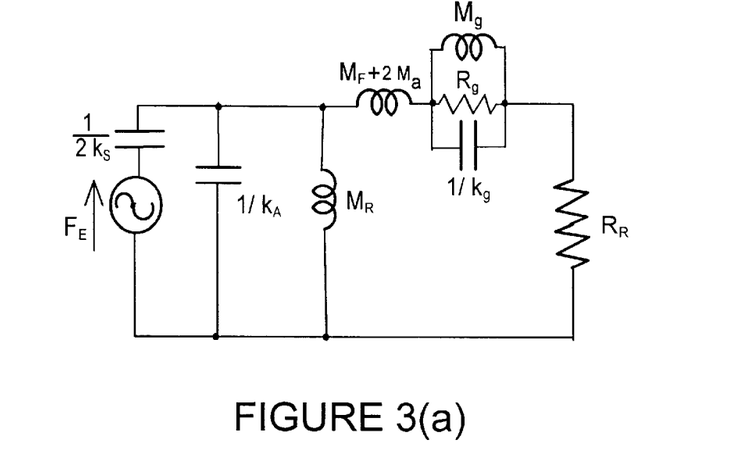
FIG. 3(a) shows an electrical analogy equivalent circuit representing the electrodynamic mechanical system of FIG. 2(a).
Figure 3B:
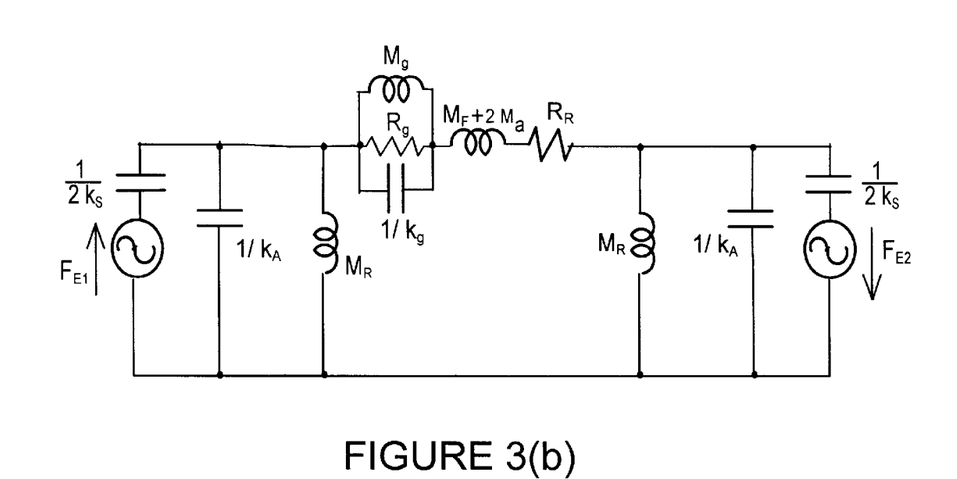
FIG. 3(b) shows an electrical analogy equivalent circuit representing the electrodynamic mechanical system of FIG. 2(b).

FIGS. 3(a) and 3(b) show electrical analog equivalent circuits by which the mechanical models shown in FIGS. 2(a) and 2(b) may be represented for convenient analysis of the transfer function from the force driver excitation, $F_X$, to the resulting force and velocity at the seismic wave radiation resistance component of the ground medium. The electrical analogy used in these equivalent circuits is based on the equivalence between mechanical force and electrical voltage in the respective mathematical equations describing the dynamic response. In particular, voltage corresponds to force, current corresponds to velocity, inductance corresponds to mass, capacitance corresponds to spring compliance (i.e., to the reciprocal of spring stiffness), and resistance corresponds to ground damping losses and to the seismic wave radiation loss. Applying conventional circuit analysis to the electrical analogy circuits shown in FIGS. 3(b) and 3(d) leads to the fact that, if the two electrodynamic and piezoelectric force driver mechanisms respectively illustrated in FIGS. 1(b) and 1(d) are physically identical in structure and symmetrical in assembly, the electrical analogy circuit configurations of FIGS. 3(b) and 3(d) reduce to the respective configurations shown in FIGS. 3(a) and 3(c). Therefore, by proper design, the two electrodynamic vibrators depicted in FIGS. 1(a) and 1(b) can be made to have the same electromechanical frequency response and output force. Likewise, by proper design, the two piezoelectric vibrators depicted in FIGS. 1(c) and 1(d) can be made to have the same electromechanical frequency response and output force. However, in general, since the piezoceramic stack and prestress bolts or rod represented by springs $k_X$ and $k_p$ in FIGS. 3(c) and 3(d) which support reaction masses, $M_R$, are inherently relatively stiff in comparison with the two-beam suspension springs in FIGS. 3(a) and 3(b) which also support reaction masses $M_R$, the electromechanical frequency responses of the electrodynamic and piezoelectric types of force driver mechanisms cannot be made the same. Thus, the electrodynamic and piezoelectric force drivers indicated in FIGS. 1(a)–1(b) and FIGS. 1(c)–1(d) are complementary in that, for a given vibrator size and weight, the electrodynamic driver systems will generally provide practical operation in a lower frequency range than the piezoelectric driver systems. This distinction makes the electrodynamic vibrator well suited for operation in ground materials having low elastic modulus (low mechanical driving-point impedance) and the piezoelectric vibrator well suited for operation in ground materials having high elastic modulus (high mechanical driving point impedance), the object in each case being to generate high-frequency vibrations and radiate associated short-wavelength seismic compressional waves in the respectively described ground media to which they are coupled.

Figure 3C:
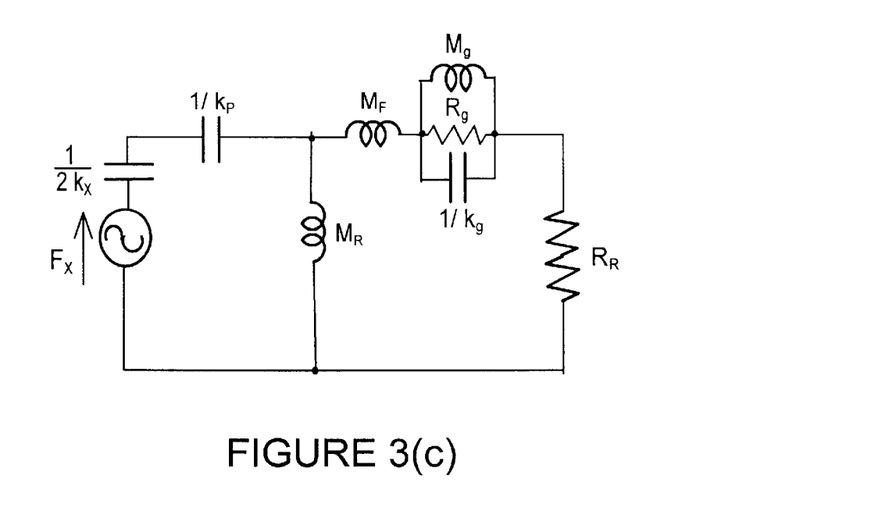
FIG. 3(c) shows an electrical analogy equivalent circuit representing the piezoelectric mechanical system of FIG. 2(c).
Figure 3D:
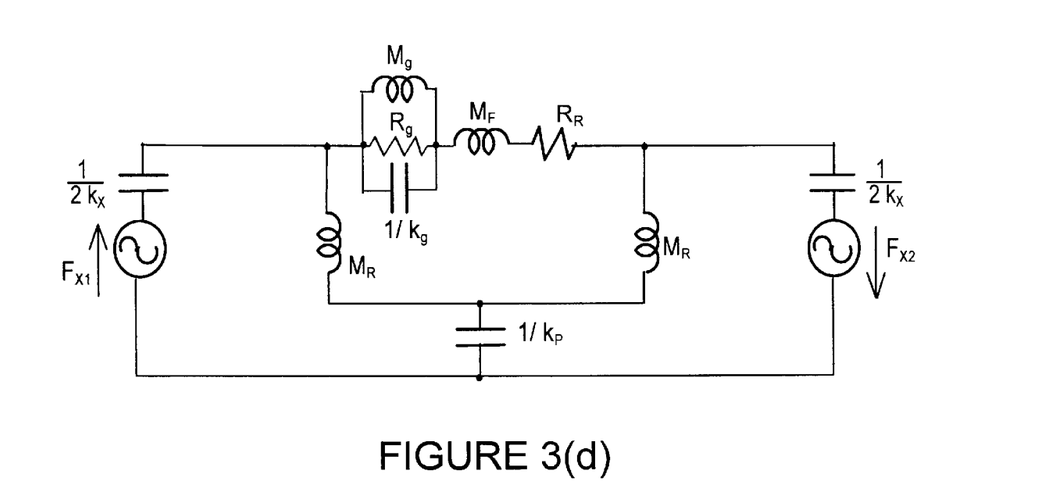
FIG. 3(d) shows an electrical analogy equivalent circuit representing the piezoelectric mechanical system of FIG. 2(d).

The mutual impedance associated with the analog circuit branch, $M_R$, in FIGS. 3(a) and 3(b), corresponding to the reaction mass in the system, preferably will be made as large as necessary to allow maximum force transfer from the force driver unit or units to the ground medium. A guideline for the size of this reaction mass is that the magnitude of its mechanical reactance should be at least equal to or larger than the magnitude of the mechanical reactance of either the suspension spring compliance, $1/(2k_S)$, or the mass of the coupling frame, $M_F$, which ever is smaller in magnitude at the lowest vibrator operating frequency of interest. A similar guideline for the size of the reaction mass, $M_R$, in the piezoelectric driver systems shown in FIGS. 3(c) and 3(d) is that the magnitude of the reaction mass, $M_R$, should be at least equal to or larger than the mass of the coupling frame, $M_F$.

The mechanical driving point impedance of the ground, represented by spring-mass-damper parameters $k_g$, $M_g$, $R_g$, and $R_R$, is dependent on the physical properties of the ground material and the baseplate contact area on the ground surface. For vertically oriented dynamic forces applied at the baseplate contact, the physical properties of the ground medium are its compressive force elastic modulus (Young's modulus) which determines the ground stiffness $k_g$, its mass density which determines the ground mass $M_g$, and its frictional dissipation, $R_g$, which is a hysteretic absorption process (retarded and imperfect vibrational energy transfer between grains or particles comprising the ground material). The ground contact area of the baseplate establishes certain characteristic dimensions of the ground influenced by the vibrator. These dimensions are used to determine the effective volume of ground material and the ground physical parameters associated with the vibrator ground coupling model.

An additional transfer of vibratory energy into the ground medium occurs at the baseplate in the form of radiated seismic waves which, because of the finite size of the contact area (i.e., the baseplate is neither a point source of radiation nor an area of infinite extent), will be partitioned into compressional waves, vertically polarized shear waves, and Rayleigh waves (surface waves). The seismic wave radiation resistance, $R_R$, is governed by the contact area of the baseplate, the detailed manner in which the surface contact and physical edges of the baseplate impart compressive and shear forces to the ground, and the mechanical driving point impedance of the ground governed by $M_g$, $k_g$, and $R_g$. Radiation resistance, $R_R$, is not a directly measurable parameter of the ground in the same sense that the elastic moduli and mass density are measurable parameters. However, the value of $R_R$ is directly related to the energy radiation efficiency of the vibrator source. By this fact and the fact that ground-coupled seismic wave radiation sources, such as explosive shots, have an efficiency ranging from about 15 percent to about 50 percent depending upon the physical properties of the ground material, a typical value of the vibrator radiation resistance may be defined for use in the analysis and characterization of the seismic response of the vibrator source. In the absence of any vibrational forces and stresses in the ground material which exceed the plastic limit of deformation, the energy transfer efficiency to the radiation resistance, $R_R$, may be assumed to be relatively high, typically 50 percent or higher.

Figure 4A:
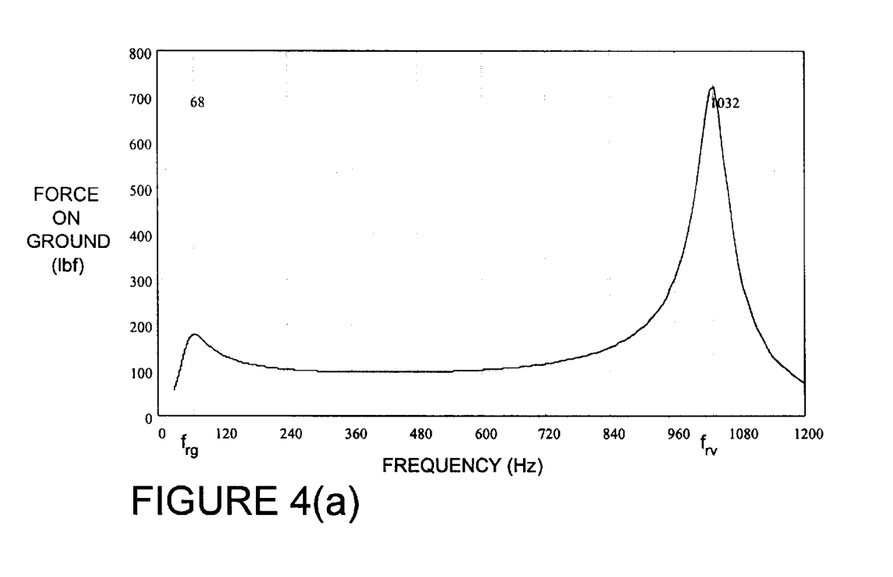
FIG. 4(a) illustrates a characteristic frequency response of output force generated by electrodynamic vibrator.
Figure 4B:
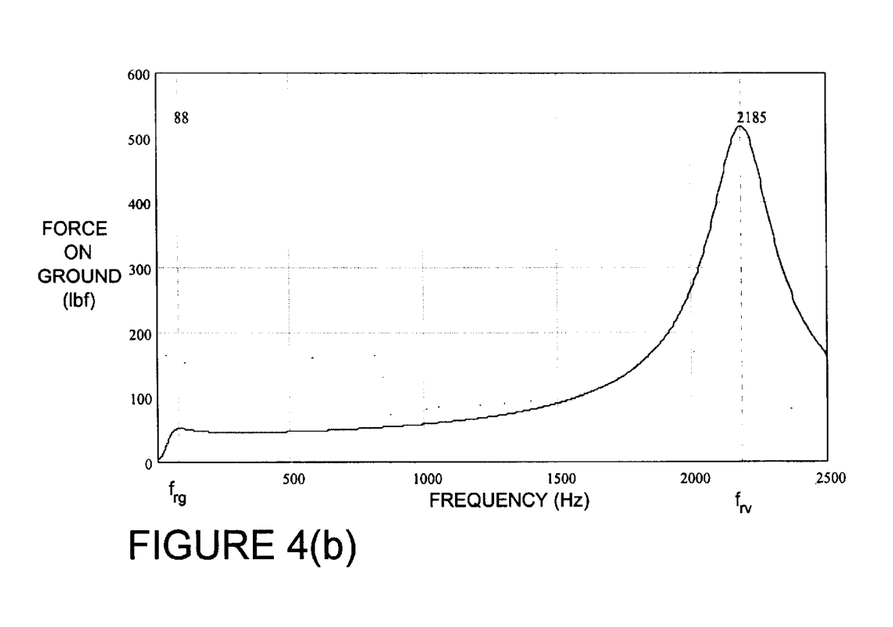
FIG. 4(b) illustrates a characteristic frequency response of output force generated by piezoelectric vibrator.

FIGS. 4(a) and 4(b) illustrate the general form of the steady-state force frequency response for a constant-amplitude sinewave excitation force applied to the driver unit input terminals measured at the radiation resistance representative of the vibrator configurations illustrated in FIGS. 1(a) and 1(b) and FIGS. 1(c) and 1(d), respectively. In these frequency response plots, the low-frequency resonance peaks, $f_{rg}$, are associated with the relatively large effective mass and low stiffness of the localized ground medium underlying the baseplate. The high-frequency resonance peak, $f_{rv}$, is associated primarily with the mass of the coupling frame and the compliant springs or piezoelectric stack assemblies linking the frame and the reaction masses together. In practice, the low-frequency ground resonances will be about 50 Hz, or less, for a compacted natural earth medium and as high as about 100 Hz for rigid ground (exposed rock) and large-bulk concrete media. The resonance frequency, $f_{rg}$, is dependent on the physical properties of the earth material (i.e., the elastic moduli, density, Poisson's ratio, and internal friction loss) and the contact area of the vibrator baseplate. Substantial differences in these ground medium parameters exist between granular earth materials and other more rigid materials (such as asphalt or concrete pavements), generally resulting in more efficient mechanical coupling and greater seismic energy radiation from the vibrator into the harder materials.

The high-frequency resonances, $f_{rv}$, shown in FIGS. 4(a) and 4(b) may be adjusted by changing the compliance of the suspension springs in the case of the electrodynamic vibrators in FIGS. 1(a) and 1(b) or the compliance of the piezoceramic stack and prestress bolts or rod in FIGS. 1(c) and 1(d) and/or the mass of the composite coupling frame assembly. Resonances in the range from a few tens of Hertz to 1,600 Hz, or higher, may be attained using appropriate suspension springs in the electrodynamic vibrators [FIGS. 1(a) and 1(b)] and resonances in the range of a few hundred Hertz to several thousand Hertz for the piezoelectric vibrators [FIGS. 1(c) and 1(d)].

With particular reference to the electrodynamic vibrator, the low-frequency limit on the resonance frequency, $f_{rv}$, is governed by the strength of the suspension springs in supporting and accurately maintaining the reaction mass in proper alignment with the moving coil armature element. This vibrator-dependent resonance can be made to be lower than the desired seismic operating frequency range of the vibrator and may typically be made as low or lower than the low-frequency resonance, $f_{rg}$, inherent in the ground medium. Although in principle there is no upper limit on $f_{rv}$, resonance frequency may be adjusted to occur at or near the desired upper bound of seismic vibrator frequency response so as to introduce a rising amplitude response versus frequency that will generally be beneficial for high-frequency seismic measurements since it will offset, in part, the dissipative losses in practical ground media that inherently also increase with frequency. A further useful feature of the springs associated with the mechanical resonance of the electrodynamic vibrator is that the compliance value of the springs may be incrementally adjusted in a prescribed predetermined function of time so as to change the mechanical resonance frequency of the vibrator in a corresponding prescribed function of time. This incrementally changeable mechanical resonance of the vibrator can be controllable in such a manner as to permit the vibrator resonance frequency to track the time-dependent frequency of a continuous sweep-frequency excitation signal applied to the electrodynamic force driver. With this arrangement, the vibrator is always operated at or near its mechanical resonance condition to provide highly efficient generation of vibration forces in the coupled ground medium. This advantage in seismic wave generation efficiency is especially beneficial for making the overall vibrator system relatively small and compact which, when considering the size of the vibrator source device in reference to the radiated seismic wavelengths in the ground, is a very desirable and useful characteristic for accurately generating high-frequency seismic waves in the ground medium.

Figure 5A:
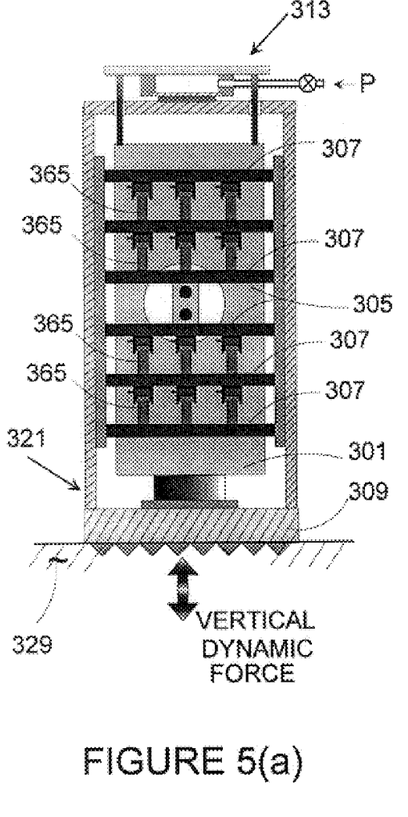
FIG. 5(a) shows an adjustable suspension system for electrodynamic vibrator employing hydraulic actuator devices.
Figure 5B:
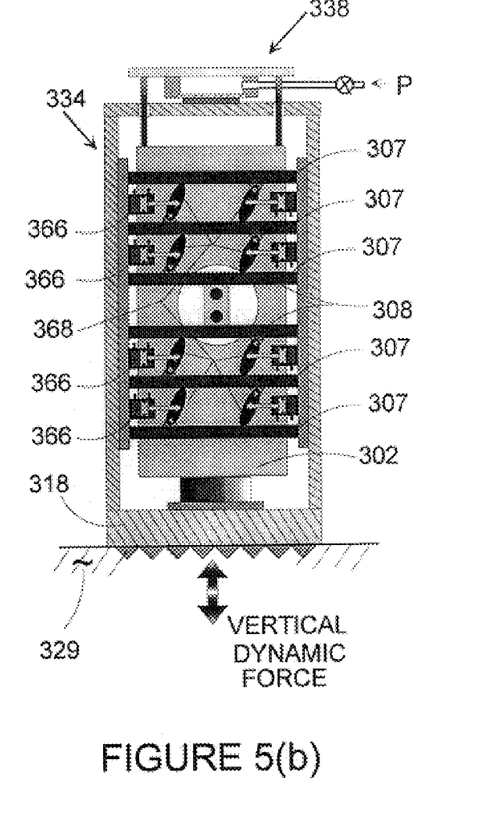
FIG. 5(b) shows an adjustable suspension system for electrodynamic vibrator employing mechanical cam actuator devices.

FIGS. 5(a) and 5(b) show two methods by which the compliance of pairs of two-beam springs 305 and 308, used to support the reaction masses 301 and 302, may be augmented and incrementally adjusted to increase the suspension stiffness so as to increase the mechanical resonance of the electrodynamic vibrator systems illustrated in FIGS. 1(a) and 1(b). In FIG. 5(a), a number of small but robust hydraulic cylinders 365 are located between several beam springs 307 and are actuated in an appropriately timed sequence to link the beam springs together to form a multi-beam spring system which will have an increasing stiffness when additional beams are coupled together. In general, the rate of change of frequency used in frequency-sweep seismic operation will be slow enough to allow practical incremental changes in spring compliance by actuating the hydraulic cylinder linkages 365 shown in FIG. 5(a). FIG. 5(b) shows a similar multi-beam spring system in which the beam springs 307 are linked together by mechanically actuated cams 368 to achieve the same result as that obtained using the hydraulic cylinders shown in FIG. 5(a). For fast-action operation, the mechanical cams shown in FIG. 5(b) are operated by hydraulically actuated shift levers 366 driven in the appropriate time sequence required to achieve the desired changes in overall spring stiffness versus time. The use of mechanical cams 368 offers a positive means of achieving high rigidity in the incrementally added linkages which combine the beam springs 307 in parallel and, therefore, this method, possibly also implemented in combination with hydraulically actuated linkages similar to those shown in FIG. 5(a), will provide the widest range of adjustment in spring suspension stiffness.

In reference to FIG. 5(a), the two-beam springs 305 located on diametrically opposite sides of the vibrator body and reaction mass 301 nearest the center are permanently attached to the vibrator and reaction mass 301. These springs have relatively low stiffness (relatively large compliance) so as to provide the lowest mechanical resonance frequency of the system. These first springs 305 are sequentially stiffened by rigidizing in prescribed time sequence, via application of hydraulic pressure, a plurality of small hydraulic cylinders 365 whose physical linkages bring additional beam springs 307 into action to introduce additional stiffness in parallel with the first springs 305. This variable-stiffness suspension spring, $k_L$, is illustrated in FIG. 2(b) representing a means for achieving tunable resonance control of the electrodynamic vibrator. The incremental increases in composite spring stiffness cause the mechanical resonance of the vibrator system to increase by an amount approximately proportional to the square root of the total cumulative stiffness of the spring support system. The incremental changes of this multi-beam spring support system are dependent on the number and stiffness of each beam spring element activated into the suspension, the number of hydraulic cylinders that are used to link the beam springs together, the hydraulic pressures applied to the cylinders, the effective rigidity achieved in each cylinder, and the order sequence in which the hydraulic cylinders are activated. The multi-beam suspension system shown in FIG. 5(a) illustrates an example having six beam springs and twelve hydraulic cylinder linkages. This configuration can introduce up to twelve incremental changes in spring stiffness when the cylinders are stepped from minimum linkage to maximum rigidity. These twelve increments can be designed to change the mechanical resonance of the vibrator system at three steps per frequency octave, thereby allowing the incremental adjustments in resonance to cover the three-octave frequency range of 200 Hz to 1,600 Hz in twelve steps. To achieve this total range of resonance adjustment, the stiffness of the spring suspension system will require a change from the lowest value of stiffness to 64 times that value of stiffness as a result of adding the sequence of supplemental beam springs.

Figure 6A:
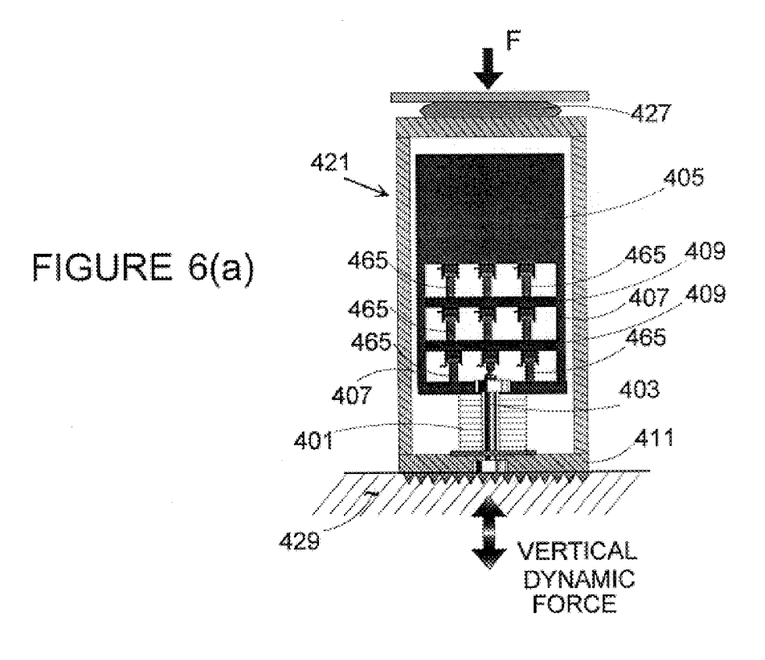
FIG. 6(a) illustrates an adjustable suspension system for piezoelectric vibrator employing hydraulic actuator devices.
Figure 6B:
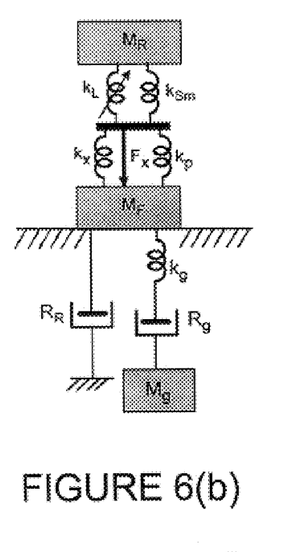
FIG. 6(b) illustrates a lumped-constant spring-mass-damper mechanical system representing the adjustable-resonance piezoelectric vibrator of FIG. 6(a).
Figure 6C:
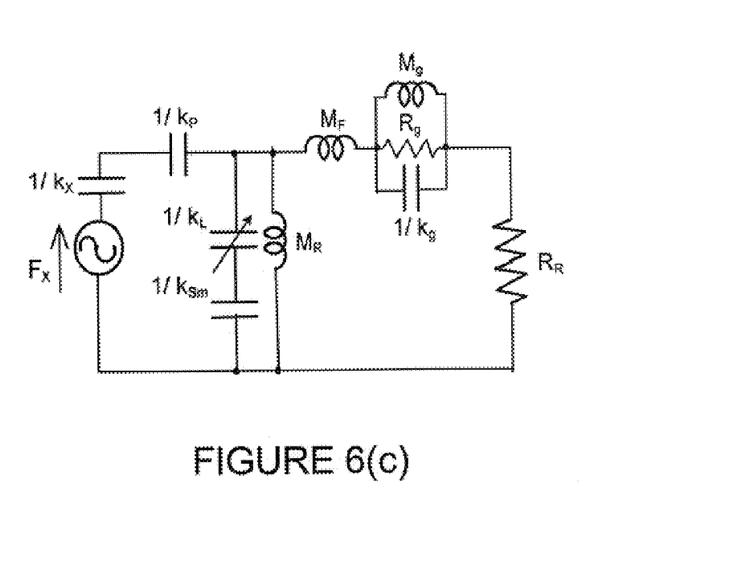
FIG. 6(c) illustrates an electrical analogy equivalent circuit representing the adjustable-resonance piezoelectric mechanical system of FIG. 6(b)

FIGS. 6(a) through 6(c) illustrate an adjustable suspension system applied to a single-driver piezoelectric vibrator adapted from the dual-driver vibrator shown in FIG. 1(d). In this configuration, the supporting elements 407 provide a compliant suspension of reaction mass 405 having the minimum stiffness required to reliably support the reaction mass 405 when none of the hydraulic actuators 465 are pressurized. This minimum spring stiffness is represented by $k_{Sm}$ in the lumped-constant mechanical system of FIG. 6(b) and in the corresponding electrical analogy equivalent circuit of FIG. 6(c). When an excitation voltage is applied to the piezoceramic drive stack 401 to produce drive force $F_X$, the vibrator system exhibits its lowest resonance frequency. Actuation of each hydraulic actuator 465 in the adjustable suspension system will cause additional beam springs 409 to become part of the suspension system. By actuating the hydraulic actuators in a systematic incremental sequence the stiffness of the suspension system will be increased in incremental steps, thereby increasing the resonance frequency of the vibrator in a corresponding manner. This adjustable stiffness is represented by the symbol $k_L$ in FIGS. 6(b) and 6(c). The highest resonance frequency of the vibrator occurs when all of the hydraulic actuators are pressurized to create the maximum practical stiffness in the multi-beam spring system. When the excitation voltage applied to the piezoelectric driver stack is a time-dependent frequency-sweep signal, the hydraulic actuators can be actuated in a controlled time sequence such that the resonance frequency of the vibrator can be adjusted versus time to track the time-dependent frequency of the excitation signal.

Firm and uninterrupted coupling of the vibrator unit to the ground is essential for achieving efficient vertical force and associated seismic compressional-wave generation and radiation. This coupling may be achieved in several ways depending on the magnitude of the force required to be imparted and the physical nature of the ground medium: (1) with a smooth or toothed, spiked, ribbed, or finned baseplate bottom surface placed in contact with the ground and held in intimate pressure contact with the ground by the normal weight of the vibrator unit; (2) by increasing the pressure on the baseplate contact area by applying additional weight on top of the vibrator frame in a manner that does not substantially increase the inertial mass of the coupling frame (for example, by coupling this additional force through an air-inflated bladder located on top of the frame); (3) by means of anchor bolts or screws inserted into the ground medium by which the baseplate of the vibrator is securely bolted to the ground medium; (4) the use of a temporary bonding agent or adhesive between the baseplate and the ground medium which, by its intentional rigidity when cured, serves as an efficient coupling interface. Other coupling methods may also be practical and effective depending upon the material comprising the medium.

The mechanical forces generated by the force drivers may be referred to the electrical terminals of the exciter units by means of mechanical-to-electrical conversion factors which are determined by the specific transduction principles of either the piezoelectric or electrodynamic driver units. In the case of piezoelectric force transduction, the force generated by a thickness-polarized multi-element stack of piezoceramic plates or disks consisting of N elements assembled in a prestressed 'sandwich' transducer is $$F_{PD} = N \cdot \left( \frac{Y_{33} \cdot A_3}{t_3} \right) \cdot d_{33} \cdot V_{PD} \qquad (1)$$

where:
 $F_{PD}$=piezoelectric force driver output force (Newton);
 N=number of piezoelectric plates in stack;
 $Y_{33}$=Young's modulus of piezoceramic material (Pa);
 $A_3$=active area of piezoceramic plate or disk (m²);
 $t_3$=thickness of piezoelectric plate or disk (m);
 $d_{33}$=piezoelectric force constant of thickness-poled piezoceramic material (m/V);
 $V_{PD}$=electrical excitation voltage applied to the piezoceramic elements (V). In the case of an electrodynamic force driver, the force generated by a current flowing through the exciter coil oriented axisymmetrically in a radially directed static magnetic field is $$F_{ED} = B_o \cdot N \cdot (\pi \cdot d_A) \cdot I_{ED} \qquad (2)$$

10 where:
 $F_{ED}$=electrodynamic exciter output force (Newton);
 $B_o$=static magnetic field intensity at moving coil armature (Weber/m²);
 $\pi \cdot d_A$=length of one turn of coil on exciter armature (m);
 N=number of turns in coil on exciter armature;
 $I_{ED}$=electrical excitation current flowing in exciter coil (amp).

These force transduction relationships are electrical-to-mechanical transformation factors by which the mechanical dynamic force is directly proportional to the applied excitation voltage or current for piezoelectric or electrodynamic transducers, respectively. The coefficients of proportionality are constants, expressed either in Newton per volt or Newton per ampere, respectively, and are dependent upon the geometry and physical properties of the materials comprising the transducers. The electrical-to-mechanical equivalent circuit analogies described earlier may be extended to include the above transformation factors to determine the overall vibrator frequency response and the electrical-to-mechanical power conversion efficiency from the electrical input terminals to the mechanical load components and, in particular, the seismic wave radiation resistance, $R_R$. The overall equivalent circuits resulting from such combined representations of the respective vibrator systems of interest may be used to predict the mechanical force delivered to the seismic wave radiation resistance component of the system as produced by a prescribed electrical input excitation waveform as well as the associated forces and stresses developed on each of the various mechanical components comprising the structure of the vibrator.

The physical components of the seismic vibrators described in the preceding paragraphs are important elements of the invention disclosed herein. Descriptions and characterizations are outlined below to explain the essential components required to construct practical embodiments of the vibrators. These explanations refer to preferred choices of materials and, where needed to be fully explanatory, the reasons for these choices are stated. Statement of the particular preferences cited below does not preclude the possible use of alternative materials or devices of similar or equivalent properties or physical characteristics in appropriate parts of the invention as may be required to achieve preferential modes of operation or for generation of seismic waves in certain specific solid media. Several alternative methods and preferences are mentioned in this regard.

Ground Coupling Frame: The ground coupling frame is preferably made of aluminum to achieve minimum mass with adequate strength and rigidity for transferring the vibrator driving forces to the ground medium.

Frame Baseplate: The baseplate is preferably made of tempered aluminum and may have a smooth surface for coupling onto soft conformable ground materials such as soil. Alternately, the contact interface between the baseplate and the ground may consist of machined gripper teeth, attached spikes, or attached fins for the purpose of gripping hard ground materials to provide effective contact over the face of the baseplate and/or to achieve a high coefficient of friction at the contact surface interface.

Compliant Support Springs: The springs used to support the reaction masses are preferably made of a high-strength fatigue-resistant material such as stainless steel or maraging steel for high strength and durable elastic stiffness and the capability of withstanding large-amplitude cyclic dynamic vibrations with long useful life. These spring components are essential in determining the mechanical resonance or adjustable resonances of the vibrator and are of a design that may be adjusted or otherwise interchanged with similar springs having a different compliance value to accommodate making changes in the vibrator resonances when required.

Force Driver Units: The force driver units embodied in the vibrator system may be either piezoelectric or electrodynamic in form:

(1) Piezoelectric Force Driver: The piezoelectric driver is a custom-designed assembly of high-force-constant piezoceramic material such as lead zirconate titanate. In particular, the piezoceramic transducer devices are constructed as prestressed multi-element stack assemblies of thickness-polarized plates or disks to achieve efficient vibrator driver operation using practical levels of applied excitation voltage. The piezoelectric force driver units deliver forces to the vibrator frame by acting against reaction masses. These reaction masses are preferably made of high-density corrosion-resistant material such as stainless steel to achieve high rigidity and compact mass. The size and shape of the reaction mass components is determined by the inertial mass needed to achieve efficient force transfer to the ground medium. The prestress rods used to hold the multi-element piezoceramic plates in compression when subjected to large vibrational stresses may also serve as the compliant spring supports for these reaction masses. Additional support springs may also be integrated as separate parts of the vibrator unit. As an alternative form of force driver to the one using piezoelectric transduction, a custom-designed driver unit utilizing a magnetostrictive material such as the rare earth material composition known as Terfenol D or other equivalent materials may be employed. For this alternative force driver, although the force generating mechanism is based on the mechanical reaction of the magnetostrictive material to a magnetic field produced by an electrical current, in comparison to mechanical reactions of piezoelectric materials to electric fields, the physical assembly of components required to construct the vibrator will be essentially the same for either type of force driver mechanism.

(2) Electrodynamic Force Driver: A permanent magnet electrodynamic vibrator device having a robust movable-coil armature which can be attached to the vibrator frame to impart excitation driving forces to the frame. The permanent magnet body of the electrodynamic driver, which is generally a component of considerable mass, may also serve as one of the spring-supported reaction masses described as part of the vibrator when used in certain design configurations.

What is claimed is:

1. A dynamic force transducer for generating vertically oriented compressional forces and motions at a surface of a solid medium for purposes of producing dynamic stresses and radiating associated seismic compressional waves in said solid medium, comprising:

a rigid coupling frame for direct contact with said surface of said solid medium, said coupling frame being in uninterrupted contact with said solid medium during vibrational operation of said dynamic force transducer;

at least one pair of identical dynamic-force driver units mounted on said coupling frame to impart vertically oriented dynamic forces having prescribed amplitude and time dependence to said coupling frame, said vertically oriented dynamic forces transferable to said solid medium;

at least one pair of identical compliant springs supporting each said pair of identical dynamic force driver units mounted on said coupling frame, compliances of each said pair of springs introducing predetermined mechanical resonances when acting in combination with the masses of said supported pairs of identical driver units and said coupling frame when excitation energy is applied to said driver units;

a means for exciting said dynamic force driver units in a manner to produce vertically oriented forces on said coupling frame whereby one of said paired driver units imparts a vertical pushing force and a second of said paired driver units simultaneously imparts a vertical pulling force equal to a pushing force, both of said forces being oriented to act along a common collinear vertical direction;

a means for electrically exciting said paired dynamic force driver units in a manner which imparts either continuous or pulsed oscillatory forces to said coupling frame, said continuous or pulsed oscillatory forces being prescribed in amplitude and time dependence to produce corresponding prescribed seismic compressional waves in said solid medium; and a means for supporting said paired dynamic force driver units in proper vertical position such that the downward force of the Earth's gravity on the mass of said dynamic force driver is counterbalanced.

2. The transducer of claim 1 in which said coupling frame has either a smooth contact surface or a contact surface containing gripper teeth or spikes or fins or other similar means for penetrating substantially into said solid medium to promote intimate and uninterrupted contact with said solid medium and to achieve vertically oriented vibrational coupling with said solid medium.

3. The transducer of claim 1 having sufficient weight to achieve firm and uninterrupted contact with said solid medium during vibrational operation.

4. The transducer of claim 1 in which at least one anchoring device provides positive attachment of said coupling frame to said solid medium.

5. The transducer of claim 1 further comprising an auxiliary force generator for urging said transducer into uninterrupted contact with said solid medium during vibrational operation.

6. The transducer of claim 1 in which at least one pair of said identical compliant springs supporting each said pair of dynamic force driver units is adjustable in compliance to permit said mechanical resonance associated with said pair of dynamic force drivers to be changed as a means of modifying a frequency range of seismic compressional waves radiated into said solid medium.

7. The transducer of claim 1 in which said dynamic force driver units employ piezoelectric force generating elements, said elements being excited by a prescribed electrical voltage waveform to produce either continuous or pulsed dynamic forces.

8. The transducer of claim 1 in which said dynamic force driver units employ magnetostrictive force generating elements, said elements being excited by a prescribed electrical current waveform to produce either continuous or pulsed dynamic forces.

9. The transducer of claim 1 in which said dynamic force driver units employ electrodynamic members comprising a movable coil in a static radially oriented magnetic field, said magnetic field being produced within a body of each said dynamic force driver unit, and said coil carrying a prescribed time-dependent electrical current waveform to produce either continuous or pulsed dynamic forces.

10. The transducer of claim 1 in which said compliant springs are incrementally adjustable either by hydraulic means or mechanical means to change their compliance according to a prescribed predetermined function of time so as to systematically change a mechanical resonance frequency associated with said compliant springs and the mass of said coupling frame in a corresponding prescribed function of time, said prescribed change in said mechanical resonance frequency being synchronized to equally track said prescribed excitation signal having a continuously changing frequency.

11. The transducer of claim 1 in which said means for supporting said at least one pair of identical force driving units of claim 1 against the downward force of the Earth's gravity is comprised of a pneumatically pressurized chamber having a flexible diaphragm side which can be adjusted by air pressure to support the mass of said pairs of dynamic force driver units when oriented in the vertical direction.

12. A dynamic force transducer for generating vertically oriented compressional forces and motions at a surface of a solid medium for purposes of producing dynamic stresses and radiating associated seismic compressional waves in said solid medium, comprising:

a rigid coupling frame in direct contact with said surface of said solid medium, said coupling frame being in uninterrupted contact with said solid medium during vibrational operation of said dynamic force transducer; and at least one electrodynamic force driver unit mounted on said coupling frame to impart vertically oriented dynamic forces having prescribed amplitude and time dependence to said coupling frame, said at least one electrodynamic force driver unit further comprising:

a vertically oriented movable coil located axisymmetrically in a radially oriented static magnetic field produced within the body of said electrodynamic force driver unit, said coil carrying a prescribed electrical current waveform to produce either continuous or pulsed dynamic forces, said electrodynamic force driver body capable of producing said static magnetic field radially oriented relative to an axis of a shaft and coil supported by at least one pair of identical compliant springs attached to said coupling frame, said springs having a value of compliance which, when acting in combination with a mass of said coupling frame and said shaft, is capable of introducing predetermined mechanical resonances when excitation energy is applied to said dynamic driver unit;

said body of said force driver unit having a generally hollow cylinder shape surrounding said shaft and coil, said hollow cylinder allowing the ends of said shaft to extend out of ends of said hollow cylinder body and attached to said coupling frame to impart dynamic forces to said coupling frame, thereby causing said coupling frame to experience equal and opposite dynamic forces relative to those transferred to said body of electrodynamic force driver which serves as an inertial reaction mass within the said transducer; and a means for supporting said electrodynamic force driver units in proper vertical position such that the downward force of the Earth's gravity on the mass of said electrodynamic force driver units is counterbalanced.

13. The transducer of claim 12 in which the combined components of said movable coil and said shaft of which said coil is an integral part and said coupling frame attached at each end of said shaft form a unitized component of said dynamic force transducer which vibrates as a result of forces associated with the magnetic field produced by prescribed oscillatory electric current flowing in said coil in reaction with said static magnetic field in said hollow cylindrical body which serves as an inertial reaction mass surrounding said coil component.

14. The transducer of claim 12 in which the body of said electrodynamic force driver unit contains a permanently magnetized ferromagnetic structure that produces the said radially directed static magnetic field against which the magnetic field produced by the time-varying current flowing in the windings of the movable coil acts to generate the said dynamic forces by which the said transducer operates.

15. The transducer of claim 12 in which the said radially oriented magnetic field is produced by a coil and ferromagnetic structure contained in said body of electrodynamic force driver, said coil carrying a direct current.

16. The transducer of claim 12 in which said coupling frame has either a smooth contact surface or a contact surface containing gripper teeth or spikes or fins or other similar means for penetrating substantially into said solid medium to promote intimate and uninterrupted contact with said solid medium and to achieve vertically oriented vibrational coupling with said solid medium.

17. The transducer of claim 12 having sufficient weight to achieve firm and uninterrupted contact with said solid medium during vibrational operation.

18. The transducer of claim 12 in which an anchoring device provides positive attachment of said coupling frame to said solid medium.

19. The transducer of claim 12 further comprising an auxiliary force generator for urging said transducer into contact with said solid medium during vibrational operation.

20. The transducer of claim 12 in which at least one pair of said identical compliant springs supporting each said reaction mass is adjustable in compliance to permit said mechanical resonance associated with said dynamic force transducer to be changed as a means of modifying the frequency range of seismic compressional waves radiated into said solid medium.

21. The transducer of claim 12 in which said compliant springs supporting said reaction masses are incrementally adjustable either by hydraulic means or mechanical means to change their compliance according to a prescribed predetermined function of time so as to systematically change the mechanical resonance frequency associated with the said adjustable springs and the mass of said coupling frame in a corresponding prescribed function of time, said prescribed change in mechanical resonance frequency being synchronized to equally track said prescribed excitation signal having a continuously changing frequency.

22. A seismic compressional wave vibrator source system utilizing a dynamic force transducer for generating vertically oriented forces and motions at a surface of a solid medium for purposes of producing dynamic compressional stresses and radiating associated compressional waves in said solid medium, comprising:

a rigid coupling frame in direct contact with said surface of said solid medium, said coupling frame being maintained in uninterrupted contact with said solid medium during vibrational operation of said dynamic force transducer;

at least one dynamic force driver unit mounted on said coupling frame to impart vertically oriented dynamic forces having prescribed amplitude and time dependence to said coupling frame so that said vertically oriented dynamic forces are transferred to said solid medium;

at least one pair of identical compliant springs supporting said dynamic force driver unit and its associated components mounted on said coupling frame, the compliances of each said pair of springs selectable or adjustable introducing different predetermined mechanical resonances when acting in combination with said supported driver unit and said coupling frame when excitation energy is applied to said dynamic force driver units;

a means for exciting said at least one dynamic force driver unit in a manner to produce simultaneous vertically oriented pushing and pulling forces on said coupling frame, said pushing and pulling forces being oriented to act along a common collinear vertical direction;

a means for electrically exciting said at least one dynamic force driver unit in a manner which imparts either continuous or pulsed oscillatory forces to said coupling frame, said continuous or pulsed oscillatory forces being prescribed in amplitude and time dependence to produce corresponding prescribed seismic compressional waves in said solid medium;

a power amplifier capable of delivering electrical excitation voltage and current to said at least one dynamic force driver unit; and an electrical excitation signal generator capable of generating predetermined continuous or pulse waveforms to be applied to the input terminals of said power amplifier, said continuous waveforms to be either frequency-modulated sinewave sweep signals having a predetermined amplitude versus frequency characteristic and a linear or a nonlinear frequency versus time sweep function, or said pulse waveforms to be either periodically repetitive or randomly timed bursts of a sine wave having a predetermined amplitude, frequency, and burst duration time, or said continuous or pulsed waveforms to consist of random noise signals having predetermined statistically determined amplitude, frequency, and time duration parameters.

23. The system of claim 22 in which said dynamic force transducer is operated to deliver a dynamic compressional force of up to approximately 1000 pounds force to said solid medium.

24. The system of claim 22 in which said dynamic force transducer is operated to produce a dynamic compressional force having a useful frequency spectrum covering the range of at least 100 Hz to 1,600 Hz.

25. The system of claim 22 in which said dynamic force transducer is adapted to operate using compliant suspension springs that are incrementally adjustable according to a prescribed predetermined function of time so as to allow said transducer to always operate at a mechanical resonance frequency equal to a prescribed excitation frequency.

* * * * *